Feb. 3, 1970     J. L. WHITENER ET AL     3,492,961
AQUATIC POWER UNIT
Filed March 13, 1968     2 Sheets-Sheet 1
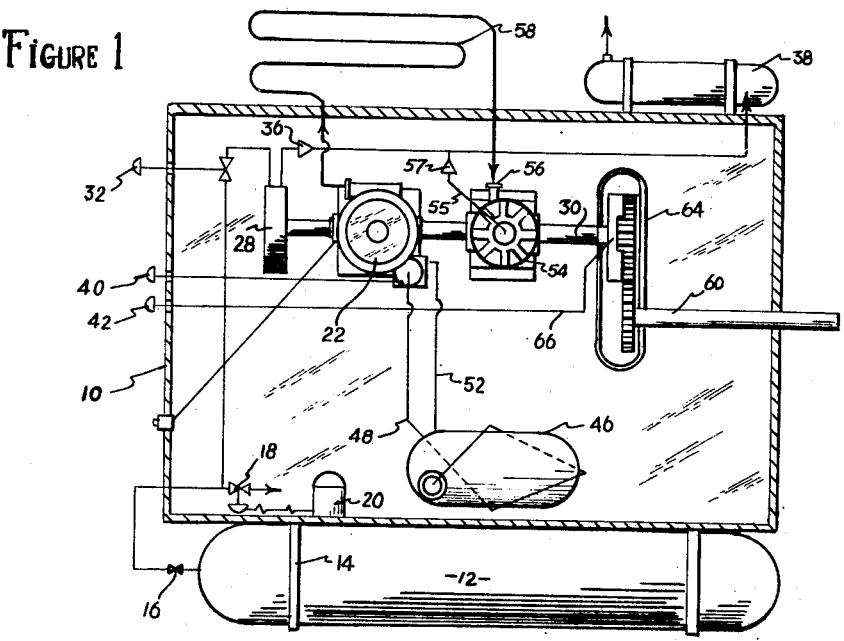
FIGURE 1
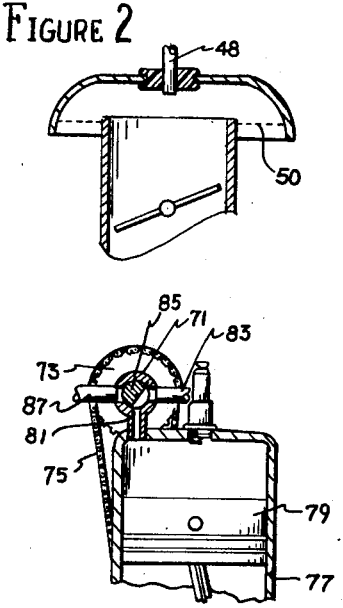
FIGURE 2
FIGURE 4
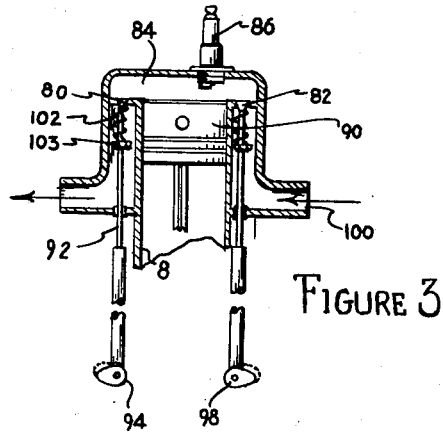
FIGURE 3
INVENTOR.
JACK L. WHITENER
WILLIAM A. BRICE
ATTORNEY Feb. 3, 1970   J. L. WHITENER ET AL   3,492,961
AQUATIC POWER UNIT
Filed March 13, 1968   2 Sheets-Sheet 2
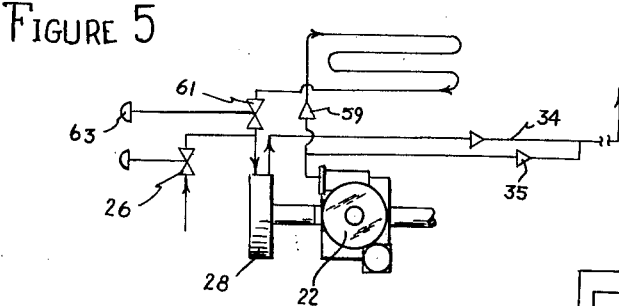
FIGURE 5
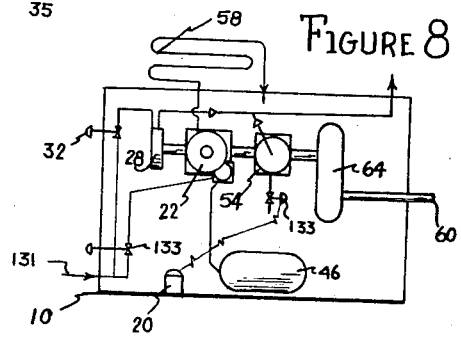
FIGURE 8
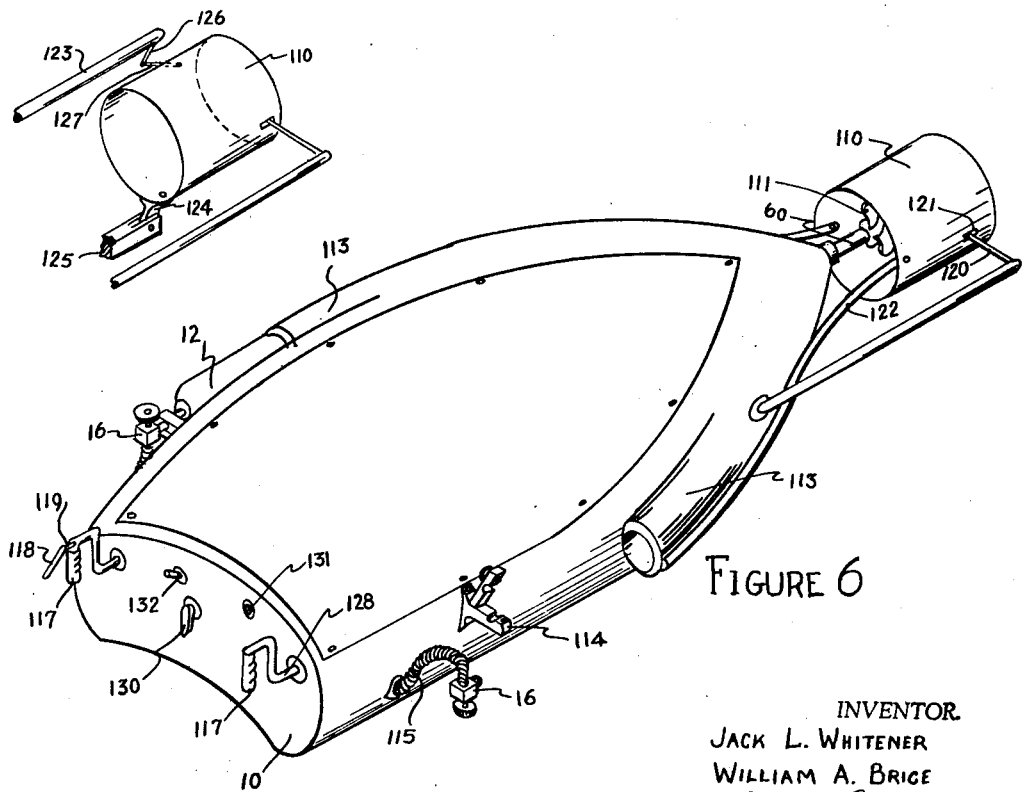
FIGURE 7
FIGURE 6
INVENTOR.
JACK L. WHITENER
WILLIAM A. BRICE
Robert E. Shaues
ATTORNEY United States Patent Office 3,492,961
Patented Feb. 3, 1970

3,492,961
AQUATIC POWER UNIT
Jack L. Whitener and William A. Brice, Bellflower, Calif., assignors to Ametek, Inc., New York, N.Y., a corporation of Delaware
Filed Mar. 13, 1968, Ser. No. 712,836
Int. Cl. B65g 8/12; B63b 21/56; F01n 7/12
U.S. Cl. 114—16                                    9 Claims

ABSTRACT OF THE DISCLOSURE

The invention comprises a submersible aquatic power unit that utilizes conventional or modified internal combustion engines of the two or four stroke cycle and of the Otto or Diesel cycle. The engines are contained within a water tight housing with air supply means through pressure regulation means into the housing which is maintained at about one atmosphere pressure. Exhaust pressuring means receive the exhaust from the engine, pressure is sufficiently to overcome the environmental pressure and discharge it from the housing. Optional features include means to cool the exhaust discharge from the engine prior to its compression in the exhaust pump. Other optional features include mounting of the exhaust compressor on the power output shaft; use of a comomn air motor for starting the internal combustion engine and to compress the exhaust during operation of the internal combustion engine; venting of the fuel tank directly to the engine's carburetor; and adaption of a four cycle engine to serve as its own exhaust gas compressor. The unit provides a portable, submersible power unit that can perform work and is particularly useful as a subsurface motive unit for divers.

DESCRIPTION OF THE INVENTION

The invention relates to an aquatic power unit useful for subsurface applications for motivation or to perform useful work. In a preferred embodiment, the invention relates to a submersible tug for underwater divers.

Prior underwater power units have used electric or hydraulic motors which have provided only low power to weight ratios and which have not been adaptable for portable use. While internal combustion engines can develop considerably greater power than electric motors of the same bulk or weight, the internal combustion engine has not been adapted heretofore to subsurface applications. Considerations that have dissuaded such applications have been the explosive hazards, combustion gas discharge, etc.

It is an object of this invention to provide an aquatic power unit utilizing an internal combustion engine.

It is also an object of this invention to provide such a power unit for submersible applications.

It is a further object of this invention to provide such a power unit that utilizes conventional two and four cycle internal combustion engines of the Otto or Diesel cycle.

It is also an object of this invention to provide an underwater power unit for propulsion of divers.

It is an additional object of this invention to provide such a power unit as a highly portable unit with a high power to weight ratio.

Other and related objects will be apparent from the following description of the invention.

The invention comprises a water tight housing with a source of compressed or liquified air, a pressure regulator with a reference plenum chamber to maintain the internal pressure of the housing at about one atmosphere pressure, an internal combustion engine of the two or four cycle type, starter means, exhaust pressuring means, optional clutch and gear reduction means in the drive train, exhaust conducting means from the internal combustion engine to the compressor and means to discharge the compressed exhaust from the chamber. The housing also contains fuel supply means connected to the carburetor of the internal combustion engine.

The invention will now be described by reference to the following figures of which:
FIGURE 1 illustrates a schematic of the unit;
FIGURE 2 illustrates carburetor modifications used in the unit;
FIGURES 3 and 4 illustrate alternative embodiments for compression of the exhaust gases for discharge from the unit;
FIGURE 5 illustrates a modification that permits use of an air motor to start the engine and to compress the exhaust;
FIGURE 6 illustrates a unit suitable as a submersible tug for divers;
FIGURE 7 illustrates a modification of the unit shown in FIGURE 6; and
FIGURE 8 illustrates an alternative for the unit shown in FIGURE 1.

Referring now to FIGURE 1, the unit is encompassed by housing 10 which is a suitable water tight housing of metal, fiberglass or other structural material. The cover of the unit is shown removed to illustrate the components. A tank 12 of an oxidant, e.g., compressed or liquified air or a mixture of oxygen and an inert diluent such as nitrogen or $CO_2$, which can also be contained within the housing is shown carried on the outside of the housing by strap fasteners 14. The air is discharged through a conventional pressure regulator 16 that reduces the tank pressure of 1000–3000 p.s.i.g. to about 100–150 p.s.i.g. The air is introduced into the housing 10 through a pressure regulating valve 18 which is set to maintain the housing pressure at about 1 atmosphere pressure and which used plenum chamber 20 as a reference. Plenum chamber 20 is sealed with an internal pressure of 1 atmosphere and this chamber can optionally be located outside of the housing if desired.

Suitable means are provided within the housing 10 to start the internal combustion engine 22 which is of single or multiple cylinders. Preferably such means to activate the engine are an air supply line 24, valve 26 and air motor 28 that is secured to the power shaft 30. Valve 26 has a stem extension that passes through the housing with hand wheel 32 outside of the housing to activate the air motor. The air motor exhaust passes through conduit 34, check valve 36 and overboard through exhaust muffler 38.

The internal combustion engine is shown at 22 and can be of the two or four cycle type. The engine as shown is two cycle. Extensions from the choke and throttle and the stop switch (which shorts the magneto coil) terminate on the outside of the housing with handles 40 and 42 to permit engine control from the exterior of the housing.

The fuel tank is shown at 46 and comprises a tank of a suitable combustible fluid, e.g., gasoline, Diesel fuel or liquified natural gas. The carburetor shown is for the combustion of gasoline; however, it is within the scope of the invention to provide a carburetor for the use of liquidified natural gas or to use a pressured fuel injection for the Diesel engines. The fuel line from the supply tank 46 is shown at 52 while the vent from this tank is shown as line 48 which is passed along the three major axes about the tank to permit operation of the unit in any position.

FIGURE 2 illustrates the modifications to the carburetor air inlet which has a screened air intake 50 that serves as a flash arrestor and prevents flashback and the resulting ignition of any fuel that may have spilled in the chamber. The entrance of the vent line from the fuel tank is also shown in this figure.

Attached to the power shaft, or geared thereto, is the exhaust gas compressor 54. This compressor can be a conventional air compressor such as shown or can be a two cycle engine identical to the power engine modified to replace the spark plug with exhaust line 55 and check valve 57. The engine is coupled to the power shaft 30 in the same stroke relationship thereto as the engine 22. To increase the efficiency of the compressor 54, the exhaust from the power engine 22 is preferably passed through cooling coils 58 which are mounted externally of the housing and are in heat exchange relation with the surrounding water. The gases are then discharged into the intake 56 of compressor 54. Use of the cooling coils 58 reduces the volume of gases charged to the compressor and thereby increases the available work output of the unit.

The drive shaft 30 extends in interconnection to the work output shaft 60. This output shaft can be simply a direct extension of shaft 30 to the outside of the housing or can be a separate shaft as shown in a driven connection to the power shaft 30. Preferably, a clutch and/or gear box 64 are provided for optimum performance of the unit. When a clutch is used, an extension shaft 66 can be provided which extends to the exterior of the housing and hand grip 68 to control the unit. Preferably, a centrifugal clutch is used and the additional control 68 is not necessary. The output shaft 60 can be connected to any suitable mechanical device or can support a screw when the unit is to be used as a tug.

The unit can be adapted for use with a four cycle engine in a manner that avoids the necessity for the compressor 54. This is a preferred embodiment and is described with reference to FIGURE 3 that illustrates the valving configuration of a four cycle engine. The engine as shown has offset valves 80 and 82 for the exhaust and intake respectively. The valves open into the cylinder head 84 with spark plug 86. The piston 90 is shown at the top dead center of its exhaust stroke in cylinder 88. In conventional valving of the engine, valve 80 is open, held in that position by push rod 92 which rides on cam 94. It is standard practice to have the engines valved for high speed operation with the intake valve 82 opened before valve 80 closes. This is commonly achieved by timing cam 98 so that it will open valve 82 while valve 80 is still retained open by cam 94.

The engine is adapted for use in our invention by modification to cause the exhaust valve to seat at or slightly before the piston reaches top dead center of its exhaust stroke to insure that the valve will be closed when the piston starts tis intake stroke. One technique for effecting the modification to the engine is to alter the shape of cam 94 by reducing the radius of the trailing edge of this cam a sufficient amount so that the exhaust valve is closed at top dead center. The reworking of the cam 94 is shown as comprising the removal of metal from this cam to reduce its trailing edge from the surface shown by the dashed line to that sown by the solid line.

Since the intake manifold 100 is at or near atmospheric pressure, it is also necessary to retard the opening of the intake valve so that the positive pressure in the cylinder does not discharge the residual gases from the cylinder into the manifold. Again, reworking of the surfaces of the intake cam 98 by removing the metal shown between the dashed and solid lines of the leading edge of this cam can retard the opening of valve 82 until the piston has returned on the intake stroke sufficiently that the pressure in the cylinder is no greater than atmospheric.

To prevent the positive exhaust pressure from forcing the exhaust valve open during the intake stroke, it is also necessary to increase the tension on spring 102 by advancing nut 103 to increase the bias on the compression spring 102 sufficiently to offset the effect of the exhaust gas pressure. When a four cycle Diesel engine is used, it is of course apparent that similar modifications to its exhaust valving can be made.

Alternative to the modifications of conventional valves in four cycle engines, the structure shown if FIGURE 4 can be used. In this construction, a rotary plug valve 71 is used and is driven from the engine with a ½ ratio to the crankshaft of the engine by suitable means, e.g., chain 75 and sprocket gear 73. The piston 79 and cylinder 77 are shown in the figure with the valve discharging through line 81 directly into the cylinder. The intake from the air fuel manifold is through line 83 while the exhaust gas line is shown as 87. The valve comprises a rotary plug 85 in the valve housing 71. Plug 85 is sectored as shown to permit valving of the cylinder to the exhaust line and the intake manifold. The sectored portion is less than a semi-circular area so that the intake manifold and the exhaust line remain sealed to each other during operation of the engine.

FIGURE 5 illustrates another technique for compression of the exhaust gases that can be used with either the two or the four cycle engines. This techniques uses the air motor that is provided to start the engine as an exhaust gas compressor after he engine has started. In this embodiment, the exhaust from the engine 22 has a bypass line directly to the air exhaust line 34 with a check valve 35. The exhaust return line from cooler 58 is connected through check valve 59 and manual valve 61 to the intake line of the air motor 28. The valve 61 can be controlled by hand wheel 63 which is located outside housing 10. The valve is closed when the air motor 28 is used to start engine 22. In this operation, the exhaust gases pass through the bypass line and check valve 35 to discharge. After the engine 22 has started, valve 26 is closed and valve 61 is opened so the exhaust gases are fed to the intake of motor 28 which now functions as an exhaust gas compressor to compress the gases for discharge at submerged depths.

FIGURE 6 is a view of the exterior of a unit which is contained within a housing suitable for use as a tug for surface or submersible operation. The unit is provided with a shroud means 110 surrounding screw 111 which is mounted on the power output shaft 60. The housing is preferably streamlined to minimize water resistance with a pointed prow 112 and integral boots 113 on each side to receive an end of the air cylinders 12. Clamping means such as brackets 114 can also be provided on each side to secure the necks or discharge lines from the cylinders and thereby lock these cylinders onto the housing 10. Flexible lines or hoses 115 are provided which connect to the valves 16 of the air cylinders and these hoses can be connected to a common air supply manifold within the housing.

The controls can be located at the rear of the unit. The choke control is shown as lever 130, the stop switch as 131 and the control of valve 26 in the air supply to the air motor is shown by toggle 132, rather than hand wheel 32 as shown in FIGURE 1. Similar toggles can be provided for the control of valves 61 and 29 when the optional features of FIGURE 5 are provided on the unit.

A hand grip 117 is provided and the throttle control of engine 22 is attached to lever 118 which preferably is secured to shaft 119 and pivots on the shaft so that the throttle control can be exercised with the heel of the diver's hand as it grips handle 117. A similar hand grip 115 is provided at the opposite side of the units; however, this grip is on shaft 128 which can be rotated and which is mechanically linked to shroud 110. The link means to the shroud can simply comprise a pin 120 which extends into a slot 121 in the side of the shroud. Shroud 110 is attached to housing 10 by a pivotable connection to arms 122 which extend from either side of the prow 112 of the unit. An angular movement of shaft 128 of a minor degree will thus tilt shroud 110 and cause the unit to dive or surface.

FIGURE 7 shows an alternative embodiment wherein a universal connection 124 can be used between a bracket 125 attached to the prow 112 and shroud 110. Shaft 123 which supports hand grip 117 can be connected with an offset arm 126 and pin 127 to shroud 110. In this manner right and left directional course changes can be effected by rotating hand grip 117 similar to the vertical changes effected by rotating hand grip 118. In practice, however, it has been found that most divers can readily effect right and left directional course changes by movement of their bodies and it is therefore preferred to provide only the depth control on handle 117.

FIGURE 8 illustrates an alternative embodiment which permits use of compressed or liquified gases richer in oxygen than compressed air. The oxygen line 131 is connected to a tank of oxygen that can be carried on the housing 10 and is injected into the carburetor downtream of the carburetor butterfly valve. Valve 133 is a proportionating valve which can regulate the flow of oxygen in proportion to the flow of fuel in line 48 from tank 46. The remainder of the unit is similar to that described in regard to FIGURE 1, except the cooled exhaust gases from coil 58 are injected directly into housing 10. Compressor 54 takes suction from the housing through valve 135 which is a pressure regulating valve that will close if the pressure in the housing decreases much below atmospheric pressure. Alternatively, a pressure regulating valve can be placed in the compressor discharge line 55 to discharge compressed exhaust gases into the housing 10 in the event that the pressure decreases below atmospheric pressure.

The carburetor of engine 22 receives recycled exhaust gases from the interior of the housing 10 and the proper proportion of oxygen from line 131 for combustion of the fuel which is admixed with the oxygen-combustion gas mixture in the same manner as in operation of the engine on air. Generally the oxygen content of the gas mixture can be about 20 percent to permit use of conventional internal combustion engines without any other changes in their carburetor construction.

While the invention has been described by reference to preferred modes of practice, it is not intended that the invention be construed as limited to the specifically illustrated means, but rather, it is intended that the invention be defined by the means and combination of means

We claim:
1. The combination for performing useful work on a load beneath the surface of a body of water which comprises:
 (a) a water tight housing;
 (b) an internal combustion engine within said housing;
 (c) a source of a combustible fuel and means to supply said fuel to said engine;
 (d) a source of an oxidant, means to supply said oxidant to said housing and means to supply said oxidant from said housing to said engine;
 (e) means to control the pressure within said housing at about atmospheric pressure;
 (f) starting means comprising a pneumatic motor having an output shaft mechanically linked to said internal combustion engine and operatively connected to a source of compressed gases to start said internal combustion engine;
 (g) means to disconnect said source of compressed gases and to introduce exhaust gases into the intake of said pneumatic motor and thereby compress said gases;
 (h) means to transfer the compressed gases from said motor to their discharge outside of said housing; and
 (i) power transmitting means extending from said housing to connect said engine to said load.

2. The combination of claim 1 including cooling means between said engine and said gas compressing means to cool said combustion gases.

3. The combination of claim 2 wherein said cooling means comprises conduit means between said engine and motor in heat exchange relation with the surrounding water.

4. The combination for performing useful work on a load beneath the surface of a body of water which comprises:
 (a) a water tight housing;
 (b) a four cycle internal combustion engine within said housing and having exhaust valve means and exhaust valve timing means operable to open the exhaust valve means during the exhaust stroke of said engine and to close the exhaust valve means slightly before the piston reaches top dead center on said exhaust stroke, and intake valve means and intake valve timing means operable to open the intake valve means after said piston has moved into the intake stroke of said engine sufficiently that the pressure in the cylinder has been reduced to a pressure no greater than the pressure in said housing;
 (c) a source of a combustion fuel and means to supply said fuel to said engine;
 (d) a source of an oxidant, means to supply said oxidant to said housing and means to supply said oxidant from said housing to said engine;
 (e) means to control the pressure within said housing at about atmospheric pressure;
 (f) gas discharge means to transfer the exhaust gases from said engine to discharge outside of said housing; and
 (g) power transmitting means extending from said housing to connect said engine to said load.

5. The combination of claim 4 wherein said exhaust valve is a rotary plug valve.

6. The combination of claim 1 with an internal combustion engine of multiple cylinders.

7. The combination of claim 4 wherein said four cycle engine has multiple cylinders with individual valve means and valve timing means for each of the multiple cylinders.

8. The combination of claim 4 wherein said engine is a Diesel engine.

9. The combination of claim 4 wherein said means to supply fuel to said engine and said means to supply oxidant to said engine comprises common carburetor means.

References Cited

UNITED STATES PATENTS

| | | | |
|---|---|---|---|
| 953,146 | 3/1910 | Jaubert | 114—16 X |
| 1,126,616 | 1/1915 | Cage | 114—16 |

TRYGVE M. BLIX, Primary Examiner

U.S. Cl. X.R.

115—6.1